United States Patent [19]

Kreitzberg et al.

[11] 4,137,791

[45] Feb. 6, 1979

[54] ROTATABLE PIVOTAL TRANSMISSION SHIFT LEVER

[75] Inventors: Ernest A. Kreitzberg, Mukwonago; William J. Zajichek, New Berlin, both of Wis.

[73] Assignee: Allis-Chalmers Corporation, Milwaukee, Wis.

[21] Appl. No.: 841,191

[22] Filed: Oct. 11, 1977

[51] Int. Cl.² .................................................. G05G 9/16
[52] U.S. Cl. ........................................................ 74/473 R
[58] Field of Search ............. 74/473 R, 473 SW, 475, 74/476, 477

[56] References Cited

U.S. PATENT DOCUMENTS

| 2,497,930 | 2/1950 | Creson | 74/473 SW |
| 2,861,465 | 11/1958 | Winkle et al. | 74/473 R |

FOREIGN PATENT DOCUMENTS

| 455260 | 2/1950 | Italy | 74/473 R |
| 300014 | 11/1928 | United Kingdom | 74/473 R |

Primary Examiner—Allan D. Herrmann
Attorney, Agent, or Firm—Arthur L. Nelson

[57] ABSTRACT

A rotatable shift lever for selectively shifting a vehicle transmission by rotating the shift lever handle and pivoting the lever to selectively engage the desired gear ratio of the transmission.

10 Claims, 7 Drawing Figures

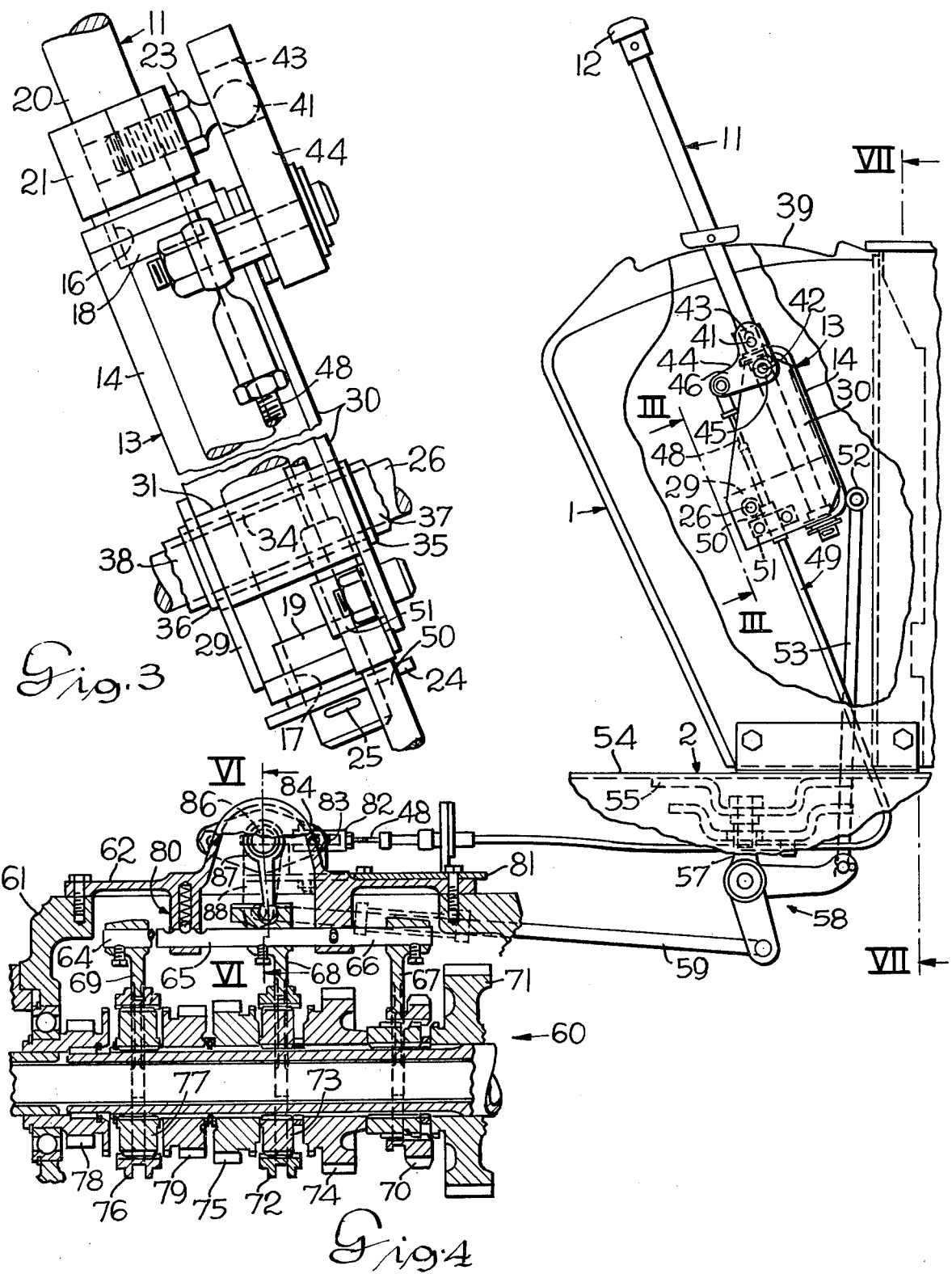

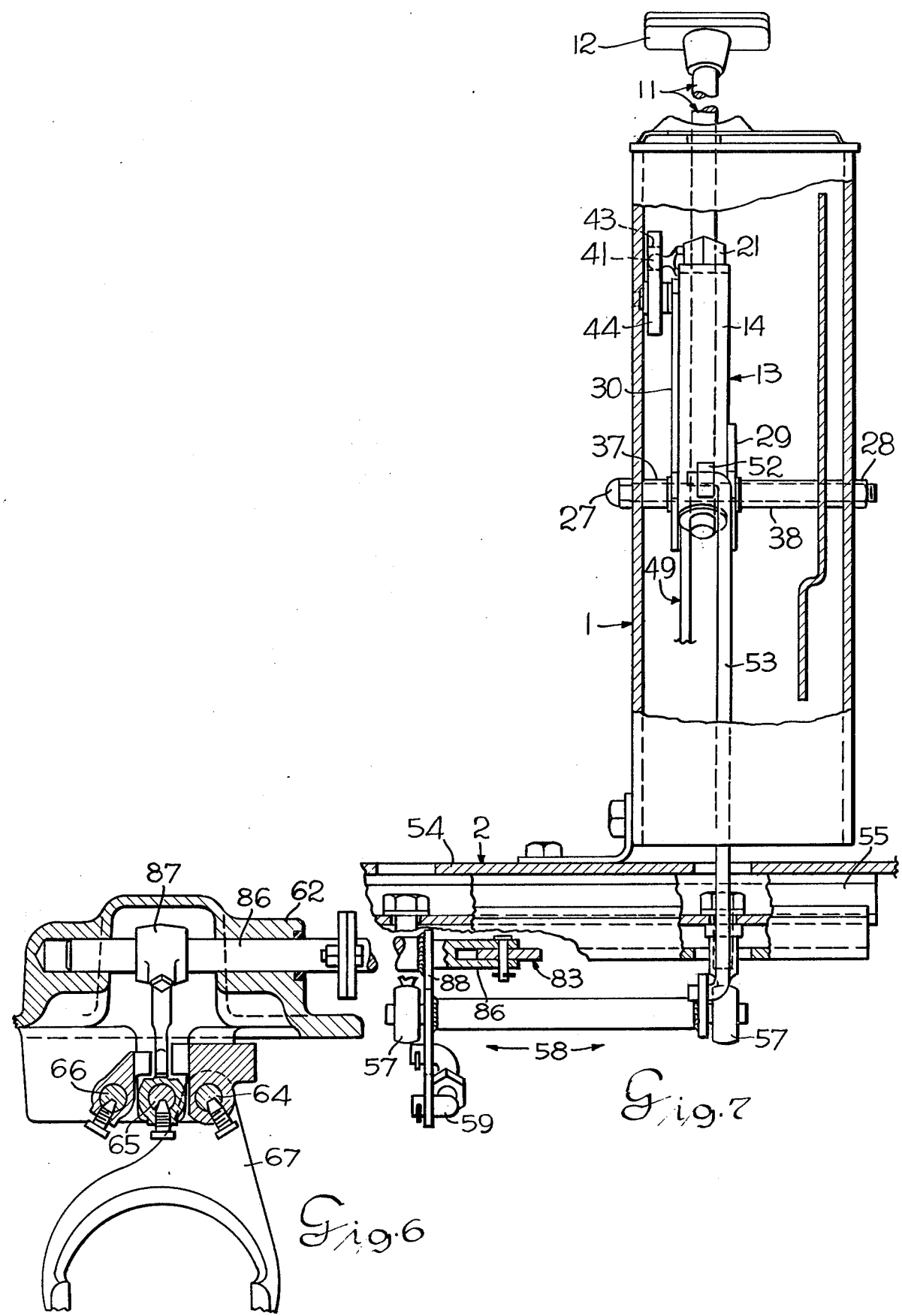

ROTATABLE PIVOTAL TRANSMISSION SHIFT LEVER

This invention relates to a shift lever for a transmission and more particularly to a lever for a transmission for selectively engaging one of a plurality of shifting members by rotation of the shift lever handle and shifting the shifting member by pivoting the shift lever as the vehicle transmission is shifted.

The modern tractor with its greater versatility through hydraulic operations has increased in its complexity of controls. Convenience of operation is necessary for control of the vehicle and implements associated therewith. Accordingly, this invention provides a transmission shift lever on the control console with a handle on the lever to selectively engage a shifting member and means for pivoting the shift lever fore and aft to selectively shift the transmission through a sequence of gear ratios.

Accordingly, it is an object of this invention to provide a transmission shift lever with a rotatable handle and pivotally mounted for shifting through selected gear ratios of a vehicle transmission.

It is another object of this invention to provide a shift lever pivotally mounted with a rotatable handle for shifting a manual transmission.

It is a further object of this invention to provide a shift lever for a vehicle transmission having a rotatable handle and pivotally mounted on a control console. The control console forms a gate plate defining the pivotal movement of the lever as it is pivoted fore and aft to shift the transmission.

It is a further object of this invention to provide a transmission shift lever with a rotatable handle to selectively engage a shift rail and pivotally mounted to shift the transmission to the selected gear ratio by reciprocating the shift rail as the shift lever is pivoted. The control console defines a slot in a gate plate to define the pivotal movement of the shift lever.

This invention is accomplished by providing a transmission shift lever pivotally mounted in a control console. The control console includes a gate plate which forms a slot to define the pivotal movement of the lever. The lever has a rotatable handle to selectively engage through a linkage a shift rail of the vehicle transmission as the lever handle is rotated. As the lever is pivoted fore and aft through the slot in the gate plate, one of a plurality of the shift rails is reciprocated to selectively shift the transmission into a selected gear ratio.

Referring to the drawings, the preferred embodiment of this invention is illustrated.

FIG. 3 is a fragmentary view as viewed in section III—III of FIG. 4;

FIG. 4 illustrates a side elevation view of a portion of the control console and the connecting linkage to a cross section view of the transmission;

FIG. 6 is a cross section view taken on line VI—VI of FIG. 4; and

FIG. 7 is a cross section view taken on line VII—VII of FIG. 4.

Figure 1:
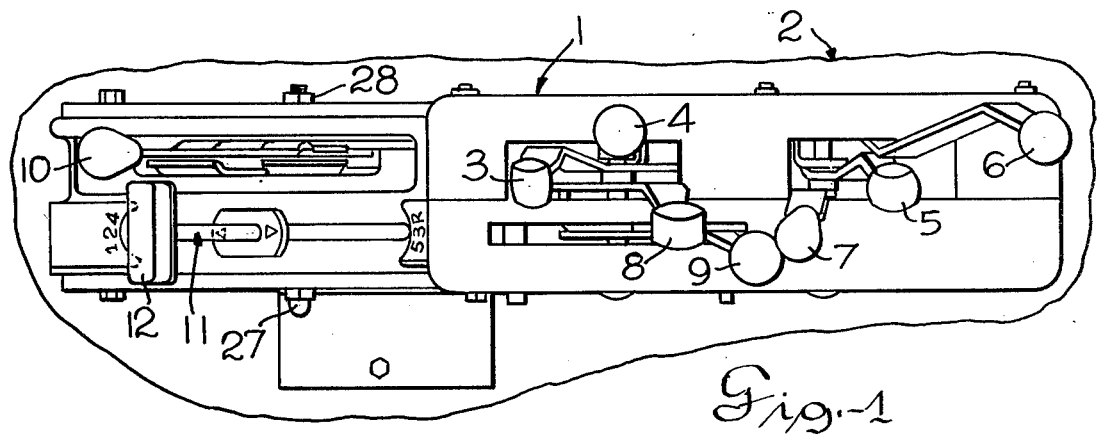
FIG. 1 illustrates a plan view of the control console and the control levers including the transmission shift lever.
Figure 2:
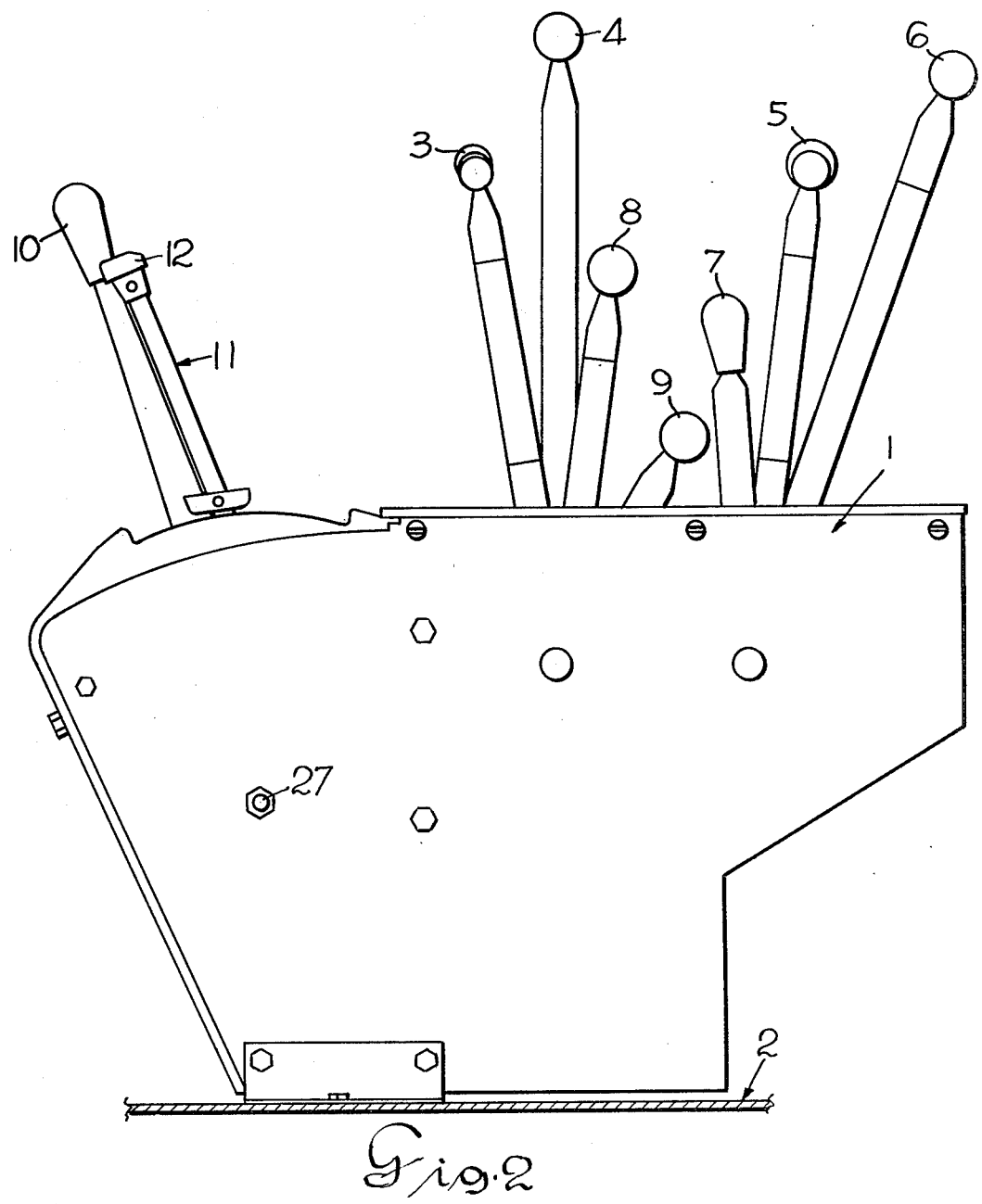
FIG. 2 illustrates a side elevation view of the control console and the control levers including the shift lever which are shown in FIG. 1.

Referring to FIG. 1, the plan view of the control console is shown. The control console 1 is mounted on the tractor 2. The hydraulic controls for the tractor are shown which include the levers for controlling remote hydraulic actuators which includes the remote levers 3, 4, 5 and 6. The power take-off lever 7 controls the power take-off to an implement connected to the tractor. The hydraulic weight distribution system for transferring the weight from the front to the rear wheels of the tractor and vice versa are controlled by the position control lever 8 and the TRACTION BOOSTER lever 9. The range transmission provides a high, low and park lock controlled by the lever 10 as shown on the front of the control console 1. The vehicle transmission shift lever 11 is pivotally mounted adjacent the high, low and park lock lever 10. The control levers are mounted in the control console and are all conveniently located at the operator station on the tractor.

Referring to the drawings, the transmission shift lever 11 is shown pivotally mounted in the control console 1. The shift lever 11 includes a handle 12 on rod 20 mounted in the base 13. The base 13 includes a channel 14 having openings 16 and 17 through each of the two sides for receiving rod 20 which also extends through the bushings 18 and 19 which form the bearings for the rod 20 of the shift lever 11. The hexigonal spacer (or hub) 21 is fastened by the stud bolt 23 on the rod 20 to limit downward movement of the rod in the base 13. The washer 24 and cotter pin 25 limit upward movement of rod 20 of shift lever 11 in the base 13.

The shaft 26 is fastened by the nuts 27 and 28 in the control console 1 and pivotally supports the lever 11. The lever 11 includes the base 13 which also includes the side plates 29 and 30 which are fabricated to the channel 14 and sleeve 31 which is fabricated to the side plate 29, 30. The sleeve 31 receives the bushing 34 which pivotally supports the lever 11. The washers 35 and 36 form an interface with the end plates 29 and 30 and the ends of the sleeve 31 and are carried on the shaft 26. The spacers 37 and 38 position the shift lever 11 within the control console 1.

The shaft 26 defines the pivotal axis of the shift lever 11. The arcuate surface 39 defines a radius of curvature equal to the radius of the pivotal axis of shaft 26 pivotally supporting the shift lever 11. The handle 12 of shift lever 11 is rotated to select one of the shift rails 64, 65 or 66 for shifting to one of the forward positions or the reverse position for the transmission. The shift lever is then pivoted fore and aft to shift the shift rail of the transmission. As the rod 20 of lever 11 is rotated on its axis, the stud bolt 23 which is formed with a spherical head 41 rotates the bell crank 44. The spherical head 41 is received in the slot 43 of the bell crank 44. The bell crank 44 is pivotally supported on the pin 45 of the side plate 30. The arm 46 of the bell crank 44 is pivotally connected to the cable 48 of the sheathed cable 49. The sheath 50 of the sheathed cable 49 is connected to the side plate 30 by the anchor 51.

The channel 14 also carries a bearing 52 which is pivotally connected to the rod 53. Rod 53 is pivotally connected to bell crank 58. FIG. 4 shows the control console 1 mounted on the platform 54 of the tractor 2. The cross beam 55 carries the bearing 57 which in turn pivotally supports the bell crank 58. The underarm of bell crank 58 is pivotally connected to the rod 59.

The transmission 60 includes the housing 61 and a coverplate 62 which carries the shift rails 64, 65 and 66. The shift rail 64 carries the shift fork 67, the shift rail 65 carries shift fork 68 and the shift rail 66 carries the shift fork 69. The shift fork 67 selectively engages the reverse gear 70 with an idler gear and selectively engages the gear 70 with the clutch teeth of the gear 71. Clutch collar 72 selectively engages the clutch sleeve 73 with the gears 74, 75. Similarly, the clutch collar 76 selectively engages the clutch sleeve 77 with the gear 78 or gear 79.

Each of the shift rails is provided with a detent mechanism similar to the detent 80 as shown. Each of the shift rails slidably moves within the supports in the transmission coverplate 62 in response to movement from the shift lever 11.

The sheath 50 of the sheath cable 49 is connected to the vehicle chassis 81 and the cable 48 extends to connect through the clevis 82 to the lever 83. The lever 83 is pivotally mounted on the pin bolt 84. The arm 85 of the lever 83 is pivotally connected to the shaft 86 which carries the shift selector 87. The shift selector 87 selectively engages shift rails 64, 65 or 66 depending on the position of the lever 83 in response to rotating of the handle 12 of the shift lever 11. The shaft 86 engages the detent 187 when shift selector 87 is positioned over middle shift rail 65.

The shift lever 11 is pivotally mounted on the shaft 26 and pivots fore and aft when the vehicle transmission is shifted. The base 13 is pivotally connected to the link 53. Link 53 is connected through the bell crank 58 which in turn is connected to the rod 59 to operate the arm 88 on the shaft 86. The arm 88 reciprocates the selected one of the shift rails 64, 65 and 66 to shift the transmission into the desired gear ratio.

The operation of this device will be described in the following paragraphs.

Handle 12 can be rotated only when shift rails 64, 65 and 66 are all in their neutral position.

Figure 5:
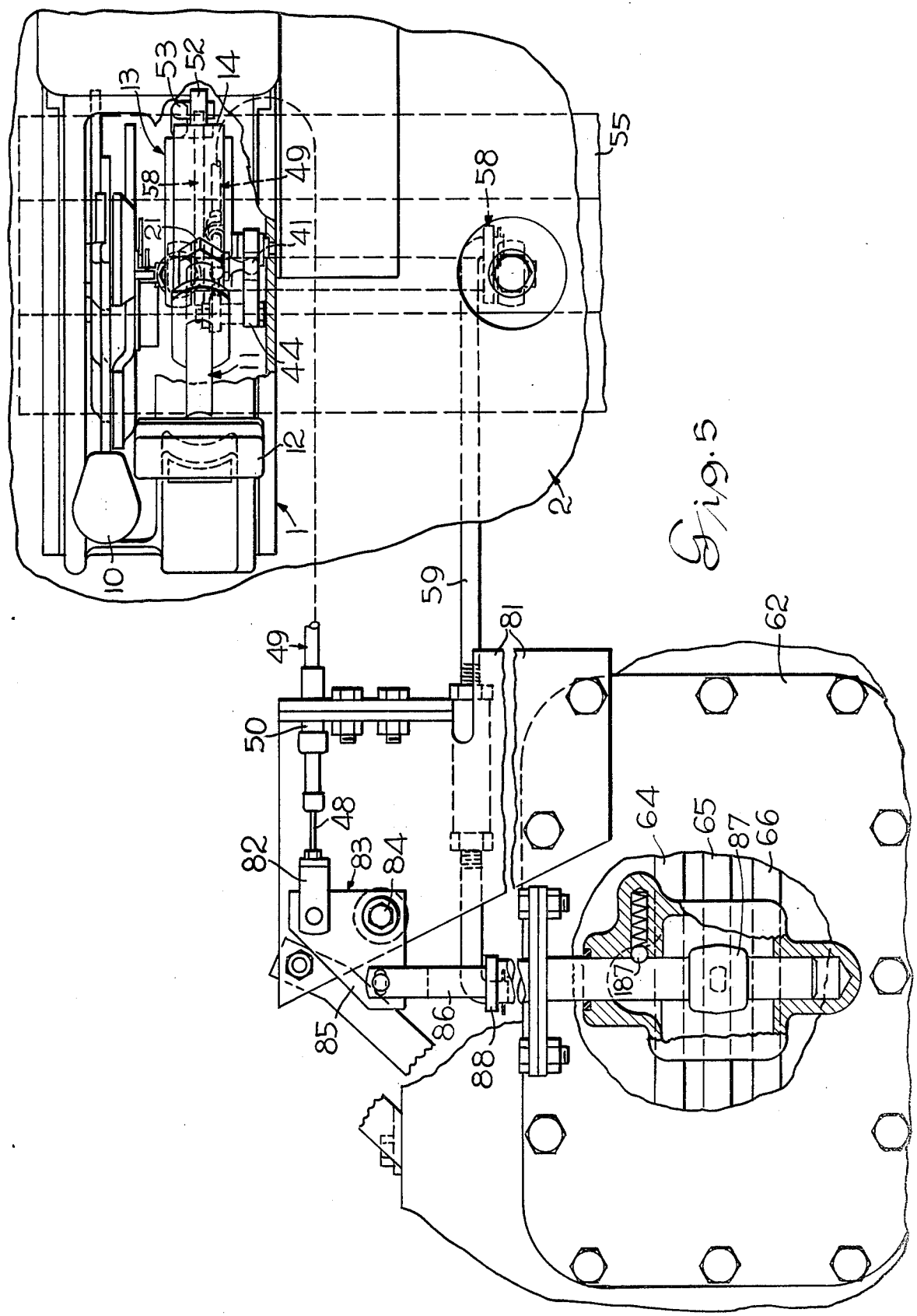
FIG. 5 is a plan view of the control console and connecting linkages to the transmission.

FIG. 4 illustrates the neutral position for the transmission and the neutral position for the shift lever 11. When the vehicle transmission is shifted, the handle 12 is rotated causing the bell crank 44 to rotate in a clockwise or counterclockwise direction depending on the shift rail to be selected. In the intermediate position, the center rail 65 is shifted fore and aft when the shift lever 11 is pivoted. The clockwise rotation of the bell crank 44 as viewed in FIG. 4 will cause the lever 83 to rotate in a clockwise rotation as viewed in FIG. 5 and cause the shift rail selector 87 to select the shift rail 64. Likewise, a counterclockwise rotation of the bell crank 44 due to rotation of the handle 12 will similarly cause a counterclockwise rotation of the lever 83 which in turn will force the shaft 86 and the shift selector 87 to select shift rail 66. When the proper shift rail is selected, the lever 11 is then pivoted fore or aft which in turn will cause the shifting linkage to move the clutch collar for shifting the gears. Clutch collar 72 shifts forward to engage the gear 75 or rearwardly to engage the gear 74 for the selected gear ratio.

Accordingly, the shift lever 11 is rotated clockwise or counterclockwise to selectively engage the shift rails 64, 65 or 66. Once the selector 87 engages the proper shift rail, the lever is then pivoted fore or aft to provide the desired speed ratio for the transmission.

The embodiments of the invention in which an exclusive property or privilege is claimed are defined as follows:

1. A transmission shifting system for shifting gear ratios of a transmission comprising, a shift lever including, a handle on a shaft for controlling the movement of said shift lever, a base rotatably supporting said shaft of said shift lever for rotation on a longitudinal axis, a control console pivotally supporting the base of said shift lever for pivoting on a transverse axis, lever means pivotally supported on said base, an arm on said shaft connected to said lever means for pivoting said lever means when said shaft is rotated, a transmission including a plurality of shifting devices, a shift selector selectively operating one of said shifting devices, a shift selector mechanism connected between said lever means on said shift lever and said shift selector for selecting one of said shifting devices responsive to rotation of said handle, a shifting means connected between the base of said shift lever and said shift selector for selectively shifting one of said shifting devices responsive to pivotal movement of said shift lever.

2. A transmission shifting system for shifting gear ratios of a transmission as set forth in claim 1 wherein said control console defines a housing to provide pivotal supporting means for said shift lever for pivoting about the transverse axis.

3. A transmission shifting system for shifting gear ratios of a transmission as set forth in claim 1 including said control console providing pivotal supporting means for said shift lever defines a gate plate forming a slot defining the pivotal movement of said shift lever.

4. A transmission shifting system for shifting gear ratios of a transmission as set forth in claim 1 wherein said lever means defines an axis parallel to said transverse axis.

5. A transmission shifting system for shifting gears of a transmission as set forth in claim 1 wherein said arm on said shaft of said shift lever defines a spherical head engaging said lever means for pivoting said lever means on the base of said lever.

6. A transmission shifting system for shifting gear ratios of a transmission as set forth in claim 1 wherein said handle defines a cross arm on said shaft for initiating a rotational movement for selectively operating the shift selector.

7. A transmission shift lever for shifting gears of a transmission as set forth in claim 1 wherein said shift lever initiates a pivotal movement for operating one of said shifting devices.

8. A transmission shift lever for shifting gears of a transmission as set forth in claim 1 wherein said shifting devices define shift rails and shift forks for shifting gears in said transmission.

9. A transmission shifting system for shifting gears of a transmission as set forth in claim 1 wherein said control console includes a gate plate defining a slot for limiting pivotal movement of said shift lever.

10. A transmission shifting system for shifting gears of a transmission as set forth in claim 1 wherein control console includes a gate plate defines a slot controlling the pivotal movement of said shift lever and defining a radius of curvature coincidental with the radius of curvature from said pivotal axis of said lever, said lever pivoting fore and aft in the slot of said gate plate to limit the pivotal movement of said lever.

* * * * *